Oct. 15, 1968  H. I. R. KARLSSON  3,405,953
SAFETY HARNESSES FOR HIGH SPEED VEHICLES
Filed Sept. 14, 1966  4 Sheets-Sheet 1
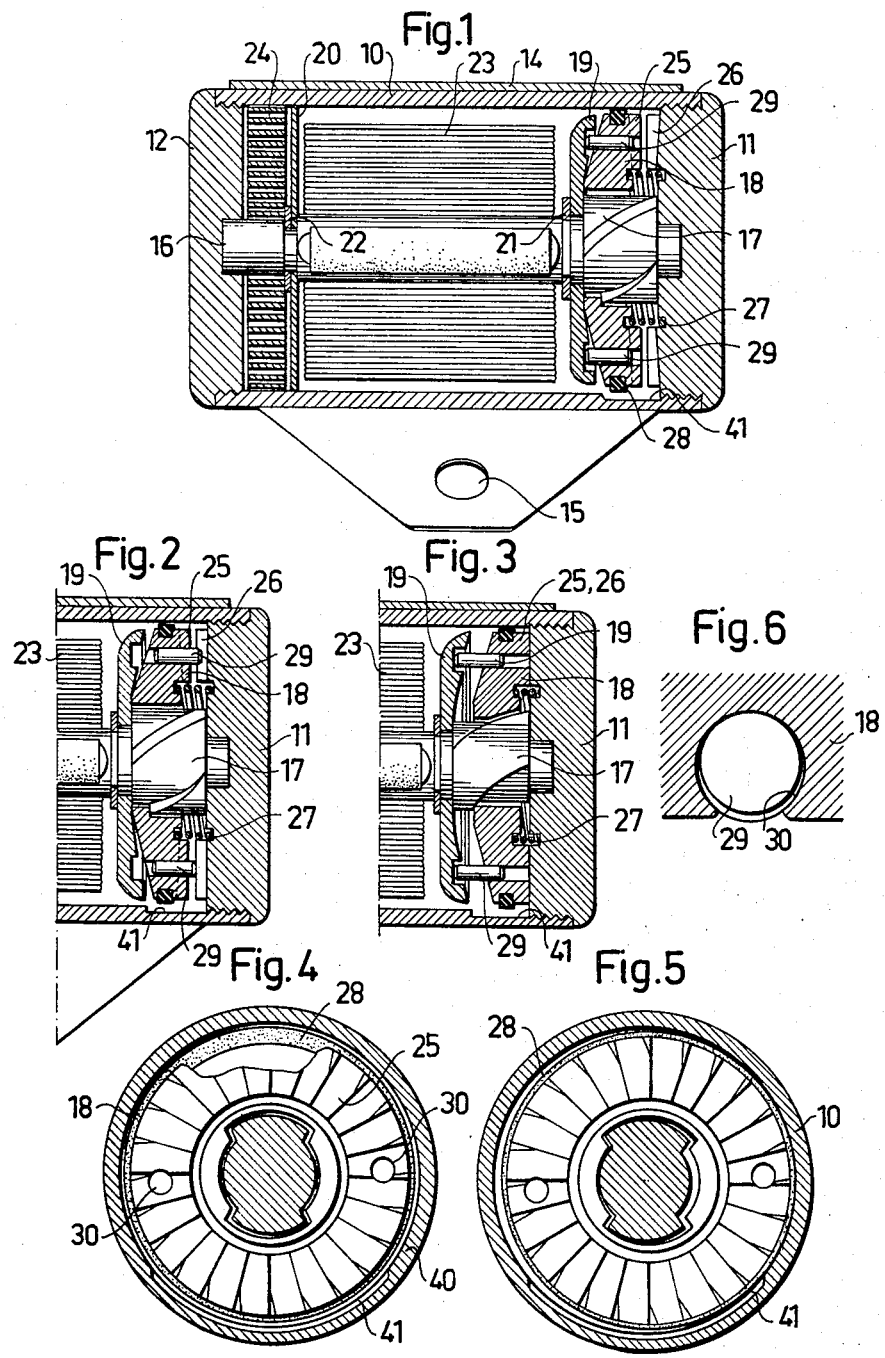

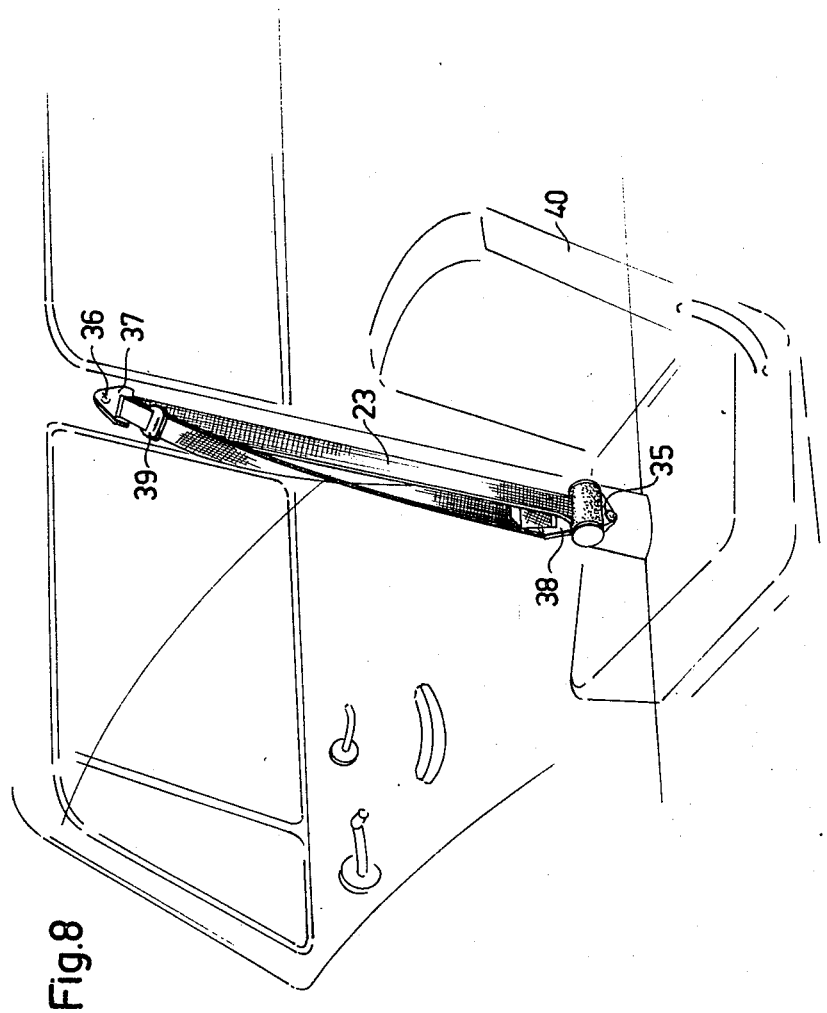

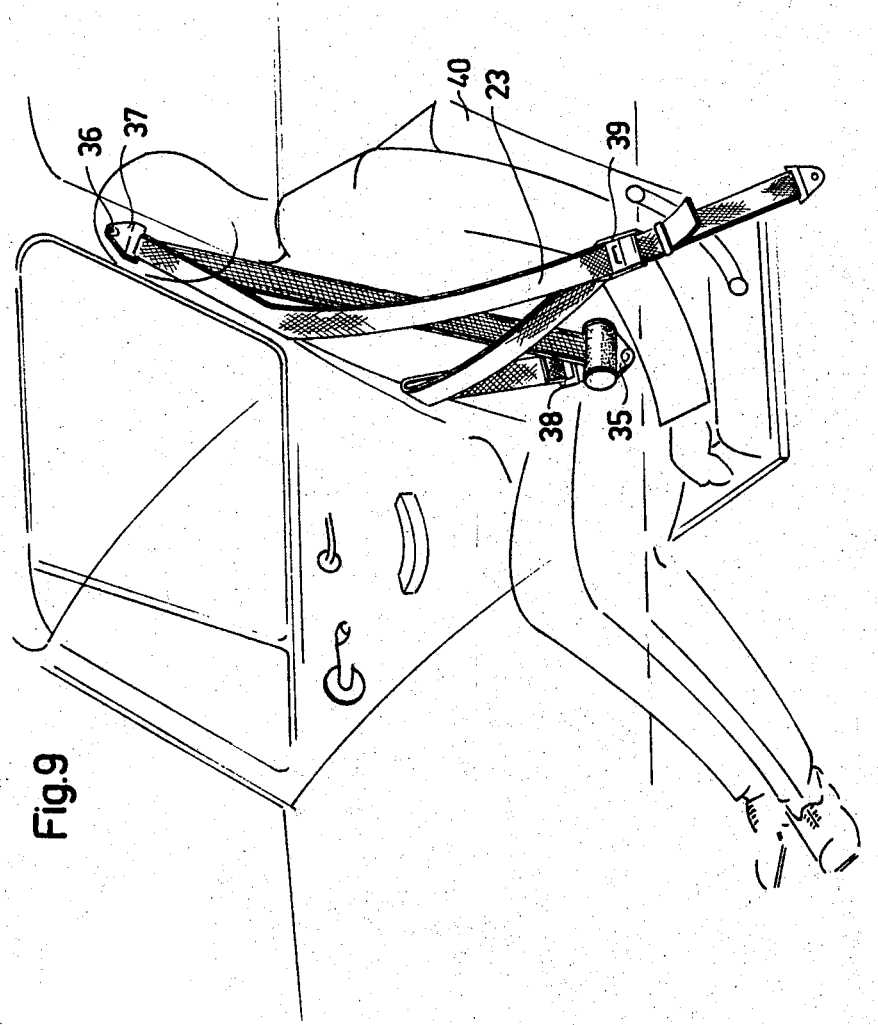

United States Patent Office 3,405,953
Patented Oct. 15, 1968

3,405,953
SAFETY HARNESSES FOR HIGH SPEED VEHICLES
Hans Ingemar Reimerts Karlsson, Engelbrektsvagen 17B, Jakobsberg, Sweden
Continuation-in-part of application Ser. No. 395,337, Sept. 9, 1964. This application Sept. 14, 1966, Ser. No. 579,398
Claims priority, application Sweden, Sept. 16, 1965, 12,057/65
18 Claims. (Cl. 280—150)

ABSTRACT OF THE DISCLOSURE

A reel, particularly suited for retaining a safety belt in a high speed vehicle, such as a motor vehicle, and adapted to automatically lock the belt upon a sudden deceleration of the vehicle but to be freely extensible under normal static and moving conditions, including a housing adapted to be attached to the vehicle adjacent the bottom of a center post of the vehicle; a spindle rotatably mounted in the housing having a spool portion to which is attached a flexible belt and a threaded portion having a plurality of helical threads extending from a point adjacent the spool portion to a point adjacent one end of the housing; a spring adapted to normally rotate the spindle in a direction to wind up the belt; a conically-shaped washer fixedly attached to the spindle between the spool portion and the threaded portion; a threaded nut having a conical face complementing the conical face of the washer, a plurality of locking teeth on the opposite face, and threads having a diameter slightly larger than the threads of the threaded portions of the spindle; a spring normally urging the nut away from the end of the casing and into contact with the washer; complementary teeth on the end of the casing matching the teeth on the nut and engageable therewith; a detent slideably mounted through a hole in the nut parallel to the axis of the spindle and engageable with the depression in the washer; the detent being adapted to be thrown into engagement with the depression in the washer upon a sudden deceleration of the vehicle to thereby lock the nut against rotation and cause the nut to travel along the threaded portion of the spindle as the spindle rotates, until its teeth are in engagement with the teeth on the casing thereby locking the position of the spindle; and a rubber gasket about the exterior of the nut adapted to frictionally engage the sides of the casing and stop the rotation of the nut when a sudden lateral deceleration causes the nut to move to one side of the casing by virtue of the difference in diameter of the threads of the nut and the threaded portion of the spindle. It is also desirable that the aperture in the nut through which the detent operates be adjacent the engaging face of a tooth of the nut and form a shallow guide groove in the front face of the tooth in question. In mounting in a vehicle, such as a motor vehicle, the reel is mounted adjacent the lower end of the center post and the belt passes upwardly to a fixture adjacent the top of the center post, slideably passes through a slot in the fixture, and thence back to a fixed point adjacent the mounting point of the reel; a clasp is slideably coupled to the belt intermediate the ends of the belt, a mating clasp is fixedly attached adjacent the bottom of the vehicle inwardly displaced from the mounting of the reel and the mating clasp is preferably attached to the free end of a second belt section which is desirably adjustable in length.

The present application is a continuation-in-part of previous United States application Ser. No. 395,337, filed Sept. 9, 1964, entitled "Device for Automatically Locking a Belt or the like," issued as Patent No. 3,323,-749, June 6, 1967. In accordance with this prior patent, an arrangement in safety harnesses for high-speed vehicles, particularly automobiles, is previously known comprising a rotary mounted wind-up spindle biased in the winding-up sense by a torsional spring and serving for winding up a belt or the like forming part of the harness, a steep-pitch screw spindle mechanically, and usually directly, connected to the latter, and a locking member for the screw spindle and constituted by a nut in screw-threaded engagement with the latter and formed with locking teeth, this nut normally occupying a non-locking axial position, but being displaceable along the screw spindle into engagement with fixed locking teeth upon rotation thereof relative to the screw spindle in a direction opposite to the direction of rotation of the spindle upon the belt being pulled out.

This known device is intended primarily to be mounted with its spindle in a substantially vertical position, thereby eliminating the need for any other nut restoring force than the gravitational force due to the weight of the nut itself. In a modified embodiment, however, the device may also be mounted in a horizontal position, in which case a spring or the like is required to displace the locking unit axially from its locking position to its non-locking position. Such spring, however, must be extremely accurately dimensioned because, on one hand, the spring is required to be forceful enough to be capable of safely returning the nut to its normally non-locking position, but, on the other hand, the spring must not be sufficiently forceful to cause the friction between the nut and the screw spindle excessively to impede rotation of the nut relative to the spindle upon rapid pullout movement of the belt.

The present invention has for its object to provide such improvements in belt-wind-up mechanisms intended to be mounted with their screw spindle, at least in a horizontal position, as to warrant reliable functioning of the mechanism even should the return spring be dimensioned to be unnecessarily forceful. With this object in view, the arrangement according to the present invention is mainly characterized in that the locking nut has formed therein one or more guide holes extending in spaced parallel relation to the axis of the nut and serving for guiding a corresponding number of detents, respectively, which are axially displaceable between a retracted inactive position and an extended active position in engagement with said fixed locking teeth, so that, upon deceleration of the vehicle, said detents, due to their inertia, will move rapidly into their locking position in which they positively stop the rotation of the locking nut, thereby causing the screw spindle, upon continued pulling-off movement of the belt, to rotate relative to the nut and to displace the nut axially into its screw-spindle-locking position.

Owing to the action of the easily floating detents, the nut will be maintained non-rotatable relative to the casing, not only in the case of emergency braking and in a collision accident, but also in the course of a normal, although not excessively smooth braking operation, this being of great advantage. A further advantage resides in that engagement between the detent or detents and the fixed locking teeth will also occur when travelling down a hill, the detents then sliding gravitionally along their guide holes due to their own weight.

The detent facility is preferably supplemented with an arrangement adapted to ensure retention of the nut against rotation relative to the casing also in the case of a rapid change in lateral velocity of the vehicle, such as when getting run into from one side by another vehicle.

For this purpose, the locking nut may be mounted on the screw spindle with a substantial radial clearance, enabling the same, due to its inertia, to move radially into engagement with the cylindrical internal wall surface of the casing, thereby rendering more difficult, or preventing, any rotation of the nut relative to the casing. For this purpose, a ring made of rubber or any other material having a great coefficient of friction to steel is preferably mounted about the peripheral surface of the nut, whereby the rubber ring will stop the radial displacement of the nut and, owing to its high friction against the casing, will prevent the nut from following the spindle in its rotation in consequence of the belt being pulled out.

The invention will now be described more in detail with reference to the accompanying drawings which illustrate a preferred embodiment thereof wherein the screw spindle constitutes a direct extension of the wind-up spindle, and in which:

FIGURE 1 is an axial section through the mechanism as shown with the detents in their retracted and inactive position;

FIGURE 2 is a part-sectional view showing the locking nut in its inactive normal position but with the detents in their extended, active position;

FIGURE 3 shows the same part-sectional view but with the nut in its locking position and the detents in a retracted, inactive position;

FIGURE 4 is an end view of the locking nut as shown in a centralized position on the spindle; whereas FIGURE 5 shows the nut in a radially off-set position on the spindle so as to engage the casing;

Figure 7A:
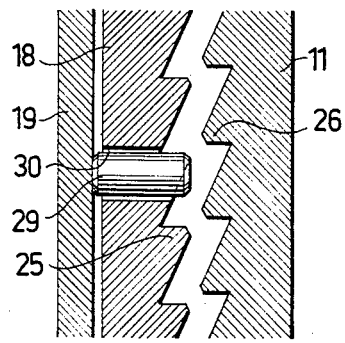
Figure 7B:
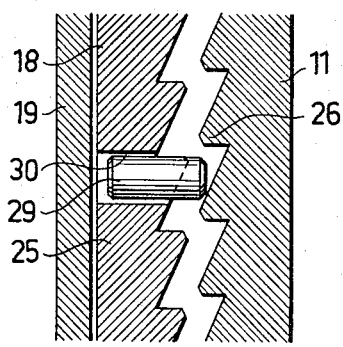
Figure 7C:
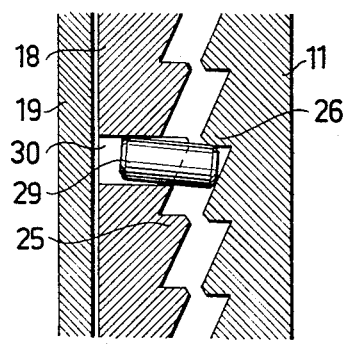
Figure 7D:
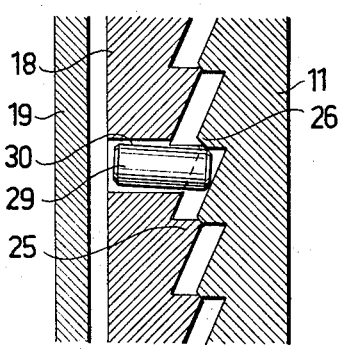
Figure 7E:
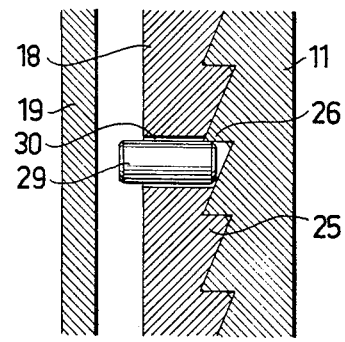
Figure 7F:
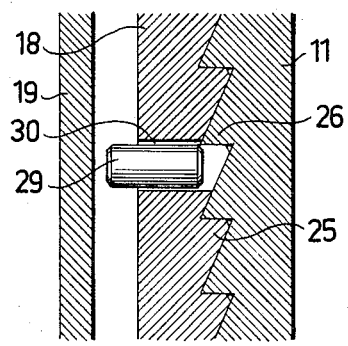

FIGURE 6, on an exaggerated scale, shows an end view of a detent introduced into its guide hole in the nut;

FIGURES 7a through 7f, on an exaggerated scale, diagrammatically illustrate the function of the detents;

FIGURE 8 illustrates a preferred method of mounting the mechanism according to the present invention in a motor vehicle; and FIGURE 9 illustrates the safety harness of FIGURE 8 in use.

In the drawings, numeral 10 denotes a cylindrical casing, while numerals 11 and 12 denote two strong end plates screwed into the respective open ends of the casing. Disposed around the casing is a steel band, designed by 14, being bent into sleeve-shaped and having its end portions bent out into spaced parallel ears, this steel band being adapted to be rigidly secured to the vehicle body by means of a screw inserted through aligned holes 15 of the ears and screwed into a threaded hole made in the body structure. Journalled in the end plates 11 and 12 is a spindle 16 having flat cut-off end faces in a close-fitting slightly spaced relation to the bottom surfaces of the bearing holes, respectively. Near its front end, spindle 16 is formed with two screw threads 17 which are quadrangular in cross section and have a steep pitch, such as of the order of 45°, and screwed onto these threads is a strong nut 18 in the form of a circular disc fitting with a clearance within the cylindrical casing. Passed over the spindle are two circular washers 19 and 20 retained in place in engagement with shoulders formed on the spindle by circlips 21 and 22, respectively. Wound onto the spindle 16 is a strong belt 23 made of nylon or the like, being introduced into the casing through a slot, not shown, through the clamping band and casing and rigidly secured at its innermost end to the spindle. Inserted between the rear end plate 12 and the rear washer 20 is a biased helical spring 24 having its outer end fastened to the casing 10 and its inner end to the spindle. Spring 24 urges the spindle 16 in a sense to end to wind up the belt 23 onto the wind-up portion of the spindle.

Locking nut 18 is formed on its front face with a large number of strong locking teeth or dogs 25 relatively uniformly spaced circumferentially, and the front end plate 11 is formed on its rear face with a corresponding number of locking teeth or dogs 26, also uniformly spaced circumferentially. When locking nut 18 is in its normal position, as shown in FIGURE 1, there exists an axial clearance of about 1 mm. between the peaks of the locking teeth or dogs 25 and 26, respectively, thus allowing the locking nut 18 to rotate freely within casing 10.

The locking nut 18, in the embodiment shown, is designed to leave a substantial radial clearance between the threads of the nut and those of the screw spindle. The rear face of the locking nut 18 is conically shaped and, in the normal position of the spindle, engages a complementary conically shaped seating formed in the front face of the relatively thick front washer 19 so as to be centered relative to the washer and screw spindle, respectively, under the action of a compression coil spring 27 having its ends engaging the bottom surfaces of two axially aligned grooves formed in the front end plate 11 and in the nut, respectively. Inserted in an annular groove extending around the peripheral surface of the nut 18 is a rubber ring 28 projecting with its outer periphery beyond the periphery of the nut. The radial clearance between the threads of the spindle 16 and those of the nut 18 is larger than the radial clearance between the peripheral surface of the rubber ring 28 and the internal wall surface of the casing 10 thereby causing the rubber ring, upon radial displacement of the nut relative to the spindle, to engage the internal wall surface of the casing.

In the course of a relatively slow pull-out motion of the belt 23, the nut 18 will follow the rotary motion of the spindle, while engaging the washer 19 in a centered position with its locking teeth or dogs 25 out of engagement with the locking teeth or dogs 26 of the front end plate 11. Thus, under these circumstances, the belt can be freely wound up onto, and pulled off from the spindle 16, thus permitting the user of the safety harness to move freely in the vehicle with the harness always remaining tightened across his breast under the action of the spring 24. On the other hand, upon a rapid pull-out of the belt occurring, the nut, due to its inertia, cannot follow up the rotation of the spindle entirely but will be caused to screw itself along the spindle while overcoming the force exerted by spring 27, so as to engage the locking teeth or dogs of the front end plate, whereby the spindle, and thus the belt 23, will stop in a fixed position so that from now on the user of the harness will remain rigidly fastened on his seat. As soon as the pull on the belt 23 ceases, the belt will be rewound onto the spindle by the action of spring 24, releasing the interengagement of dogs 25 and 26 and causing the nut 18, under the action of spring 27, to screw itself backward along the spindle and return to its normal position in engagement with the washer 19. From now on, the user of the harness again may move freely on the vehicle seat.

Locking of the belt due to the locking-nut slip conditioned by its inertia, quite specifically will take place in the case of the user of the safety harness being thrown forward relative to the vehicle upon emergency braking or upon collision with a confronting vehicle or a fixed obstacle. It is desirable, however, that the belt locking function should be guaranteed also in quite normal braking operations. To ensure this, in accordance with the present invention, the locking nut has been supplemented with inertia influencing auxiliary means adapted, in their active positions, to prevent any rotation of the locking nut relative to the casing, thereby causing the locking nut, during a pull-out motion of the belt, to be screwed more quickly and safely into its locking end position in engagement with the fixed locking teeth or dogs. These inertia influencing auxiliary means, the proper functioning of which requires the mechanism to be mounted with its spindle extending substantially in a horizontal direction, and with the teeth or dogs of its locking nut facing the travelling direction of the vehicle, are constituted, in the embodiment shown, by two cylindrical detents 29 received with an unnoticeable clearance within two diametrically oppositely disposed holes 30 formed in the locking nut. The holes 30 extend in spaced parallel relation to the axis of the nut. The detents 29 preferably have a diameter slightly in excess of half the pitch of the locking teeth or dogs, and the holes 30 are formed adjacent to, and intersecting an engagement surface of the tooth or dog which is flat in the drawing and extends in parallel relation to the axis of the nut, thereby forming a slot in said surface, see particularly FIGURE 6. It is further seen from this figure that the diameter of detent 29 is slightly smaller than the distance of a chord plane to the cylindrical surface defining the hole 30 and containing said engagement surface of the tooth or dog from a plane tangent to said defining surface in a diametrically spaced parallel relation to said chord plane, thereby ensuring that the detent cannot become wedged within the hole upon engagement taking place between the locking tooth or dog of the nut and a fixed locking tooth or dog.

The action of detents 29 is illustrated diagrammatically in FIGURES 7a through 7f showing, on an exaggerated scale, a plane development of a cross-sectional view as taken along a cylindrical surface coaxial with the nut and co-incident with the axis of the guide hole 30 for one of the detents 29. In FIGURE 7a, the locking nut and detent occupy their normal non-locking positions with detent 29 completely retracted into its guide hole 30 and supported at its rear end against the conical washer 19. Upon a deceleration of the vehicle taking place, the detent will be thrown forward into the path of one of the fixed locking teeth or dogs 26, see FIGURE 7b. If the deceleration is forceful enough also to cause the user of the harness to move forward in the vehicle, then the belt 23 will start getting pulled off the spindle 16, the latter, with a slight slip, carrying with it the locking nut 18 until the rotation of the latter will be arrested by the detent, see FIGURE 7c. Upon continued rotation of the spindle, the nut will be screwed toward the fixed locking teeth or dogs, being guided in its movement by the detents, so that, just before the engagement being established between the dogs 25 of the nut and the fixed dogs 26, the former dogs will have their engagement surfaces positioned substantially directly opposite the engagement surfaces of the fixed dogs. By slightly chamfering or beveling the dog or tooth tips in an inclined inward direction, as shown, it is possible to ensure that, during its continued axial displacement, the locking nut will be forced to rotate slightly in the opposite sense into the proper position of engagement, see FIGURE 7d, and will then be pushed further into its home position, FIGURE 7e, in which the screw spindle is locked against any further rotation. In this position the detent 29 is entirely relieved of any loading forces. This means that the detent can follow the locking nut when returning to its normally non-locking position, see FIGURE 7f, thereby getting withdrawn from its position of engagement with the fixed locking teeth or dogs and allowing the nut, from now on, to partake in the rotation of the spindle upon a relatively slow pulling-out movement of the belt. As the speed of the vehicle is again increased, the detent, due to its inertia will be slid further back within its guide hole into its completely retracted position, as shown in FIGURE 7a.

Upon a rapid change in velocity of the vehicle occurring in a lateral direction, caused, for example, by a collision with another vehicle at a road crossing, the locking nut 18 will move radially relative to the spindle 16 until the rubber ring 28 engages the internal surface of the casing 10, as shown in FIGURE 5. Owing to the high friction between the rubber ring and the casing, the nut is prevented from taking part in the rotation of the spindle caused by a rapid pulling-off of the belt, whereby, in this case, too, the locking nut will be rapidly and safely displaced in a positive way axially along the spindle into its position of FIGURE 1 thus positively locking the spindle.

In order that the above-mentioned large radial clearance between the threads of spindle 16 and nut 18, in combination with the horizontal orientation of the spindle, shall not, due to the weight of the nut, result in an engagement between the rubber ring 28 and the internal surface of the casing 10 beneath the spindle, the casing wall has been provided at this location with an internal recess 41— see particularly FIGURES 4 and 5.

Thus, the belt-locking device illustrated will function safely in any conceivable cases of a sudden change in condition of movement of the vehicle, whereby, under all circumstances, the user of the safety harness will be retained in place within the vehicle, thereby greatly reducing the risk of injury to the user.

FIGURES 8 and 9 diagrammatically illustrate a suitable method of mounting the mechanism of the invention on the vehicle. The mechanism may be fastened near the lower end of the rear door post by a screw 35 inserted through the holes 15, see FIGURE 1, and the belt is extended upward along the post to a fitting 37 fastened to the post at a suitable height by a screw 36, further through a slot made in this fitting, and back downward along the post to a bracket 38 mounted on the post adjacent the winding-off mechanism. Slidably mounted on the belt 23 between the fitting 37 and bracket 38 is a conventional belt clasp member 39. When fastening the safety harness for use, clasp member 39 is coupled together with a mating clasp member at the end of a strap or the like fastened to the vehicle at the inward side of the seat 40, see FIGURE 9, the belt 23 being pulled out to a sufficient extent against the force exerted by the winding-up spring of the mechanism. This spring will then keep the belt 23 tightened across the breast of the person using the harness, thereby eliminating any need of adjusting the belt length to suit persons of different statures. The harness is out of the way when not in use, and may be fastened by one single manipulation, thus increasing the probability of the safety harness really being used.

The invention, of course, is not restricted to the embodiment illustrated and described in detail hereinbefore, since various modifications are conceivable. As a matter of fact, the screw spindle with the locking nut could be mounted in a separate unit distinct from the belt winding-up mechanism, and using a gearing or any other mechanical movement-transmitting mechanism for connecting the wind-up spindle to the screw spindle. The conical washer against which the locking nut is centered need not be rigid with the screw spindle but could instead be rigidly mounted in the casing. Many other modifications are also possible without departing from the scope of the invention.

I claim:

1. A reel for an elongated, flexible element, comprising: a housing; spindle means rotatably mounted in said housing, including a spool portion and a threaded portion adapted to rotate together in either direction, said threaded portion having a plurality of helical threads extending from said spool portion to a point adjacent the end of said housing; an elongated, flexible element operatively attached to said spool portion of said spindle; spring means urging said spindle to rotate in a direction in which said flexible, elongated element is wound on said spool portion; stop means in the interior of said housing adjacent said threaded portion of said spindle; lock nut means threadably mounted about said threaded portion of said spindle and having its threads in operative engagement with the threads of said spindle and adapted to normally assume a position out of contact with said stop means and rotate with said spindle and to be abnormally held stationary with respect to said spindle and thereby permit said spindle to rotate in an unwinding direction relative to said nut and move said nut in a direction parallel to the axis of said spindle until said nut is positively locked against said stop means; and at least one displaceable detent means operatively coupled between said stop means and said nut means and adapted to normally assume a decoupling, inactive position in which said nut and said stop means are decoupled from one another and said nut is free to rotate with said spindle and, upon the application of a sudden deceleration of said housing, to abnormally assume a coupling, active position, due to the inertia of said detent means, in which said nut and said stop means are coupled together and said nut is held stationary with respect to said spindle.

2. A reel in accordance with claim 1 wherein the detent is displaceable along a path parallel to the axis of the nut and the spindle.

3. A reel in accordance with claim 2 wherein the axial dimension of the threads of the nut is sufficiently larger than the axial dimension of the threads of the spindle to permit radial movement of said nut relative to said spindle and into contact with the inner surface of the casing, upon a sudden change in movement of said casing in a direction normal to the axis of said spindle, thereby causing said nut to be abnormally at least decelerated relative to said spindle and permitting said spindle to rotate in an unwinding direction relative to said nut and move said nut in a direction parallel to the axis of said spindle until said nut is positively locked against said stop means, and a resilient centralizing means is operatively coupled to said nut to urge said nut into a centralized normal position out of contact with said casing and said nut, due to its inertia upon said sudden change in movement, overcomes the resilient force of said centralizing means and assumes an abnormal position in contact with said casing.

4. A reel in accordance with claim 3 wherein one face of the nut is conically shaped, a conically shaped washer having a face complementing said one face of said nut is mounted in said casing in an axially fixed position with respect to said casing and the centralizing means includes a spring urging said nut against said complementary face of said washer when said nut is in its normal position.

5. A reel in accordance with claim 2 wherein a friction means adapted to increase the frictional drag between the nut and the casing is mounted between said nut and said casing.

6. A reel in accordance with claim 5 wherein the friction means is a rubber ring mounted about the nut.

7. A reel in accordance with claim 2 wherein a washer is mounted in the casing in an axially fixed position relative to said casing and has one face conforming to one face of the nut; a spring means is operatively coupled to said nut adapted to urge said nut to assume its normal position out of contact with the stop means and in contact with said one surface of said washer; and the detent is mounted in a guide hole passing through said nut so that said detent rests on said washer in its normal decoupling position.

8. A reel in accordance with claim 7, wherein the complementary faces of the washer and the nut are conical in shape.

9. A reel in accordance with claim 1 wherein the detent is positioned in a guide hole in the nut and assumes its normal decoupling position within said guide hole and out of contact with the stop means.

10. A reel in accordance with claim 1 wherein the stop means is a toothed stop means and the nut has formed thereon complementary teeth adapted to engage said teeth of said stop means.

11. A reel in accordance with claim 10 wherein the detent is positioned in a guide hole in the nut and assumes its normal decoupling position within said guide hole and out of contact with the stop means.

12. A reel in accordance with claim 11 wherein the detent is generally cylindrical in shape and has a diameter greater than half the pitch of the teeth of the nut.

13. A reel in accordance with claim 11 wherein the guide hole is disposed adjacent the engagement surface of one tooth of the nut.

14. A reel in accordance with claim 13 wherein the engagement surfaces of the teeth of the nut have generatrices extending in parallel relation to the axis of said nut, the guide hole and the detent are generally cylindrical in shape, said guide hole intersects the engagement surface of a tooth of the nut to form a relatively shallow slot extension to said guide hole and the diameter of said detent is less than the diameter of said guide hole and said slot extension by an amount sufficient to permit said detent to freely move within said guide hole when said nut is in its abnormal position with its teeth in engagement with the teeth of the stop means.

15. A reel in accordance with claim 10 wherein the tips of the teeth of the nut and the teeth of the stop means are chamfered toward their engagement surfaces to insure the introduction of said teeth of said nut into the recesses between said teeth of said stop means when said nut is moving to its abnormal position.

16. A reel in accordance with claim 1 wherein the flexible element is a safety harness for a high speed vehicle; the casing is fixedly attached to said vehicle at one point, the free end of said flexible element slideably passes through a fitting fixedly attached to said vehicle at a second point vertically displaced from said first point and then passes back toward said casing and is fixedly attached adjacent said first point, and a clasp means is slideably coupled to said flexible element at a point intermediate its ends, said clasp means being adapted to be releasably coupled to a mating clasp fixedly attached to said vehicle at a third point horizontally displaced from said first point.

17. A reel in accordance with claim 16 wherein the mating clasp is at the one end of a second flexible element and the other end of said second flexible element is fixedly attached to the vehicle at the third point.

18. A reel in accordance with claim 17 wherein the length of the second flexible element is adjustable.

References Cited

UNITED STATES PATENTS 2,843,335   7/1958   Hoven et al. _____ 242—107.4
3,058,687   10/1962   Bentley _____ 242—107.4

WILLIAM S. BURDEN, *Primary Examiner.*